March 2, 1943.  M. W. HUBER  2,312,412
WORK CYLINDER
Filed Sept. 17, 1941
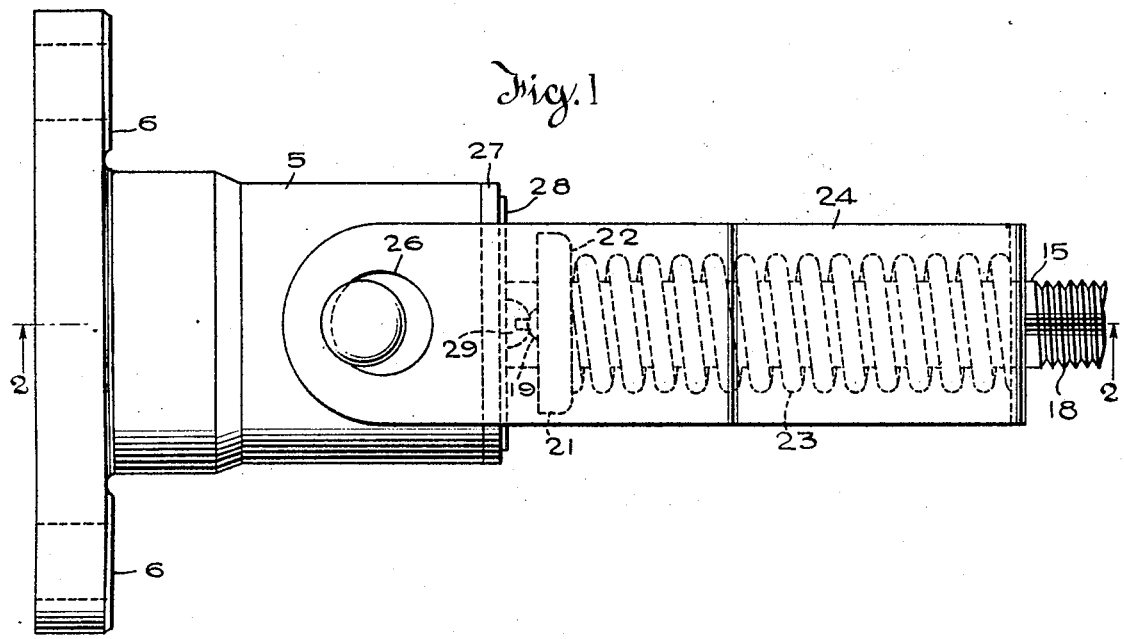
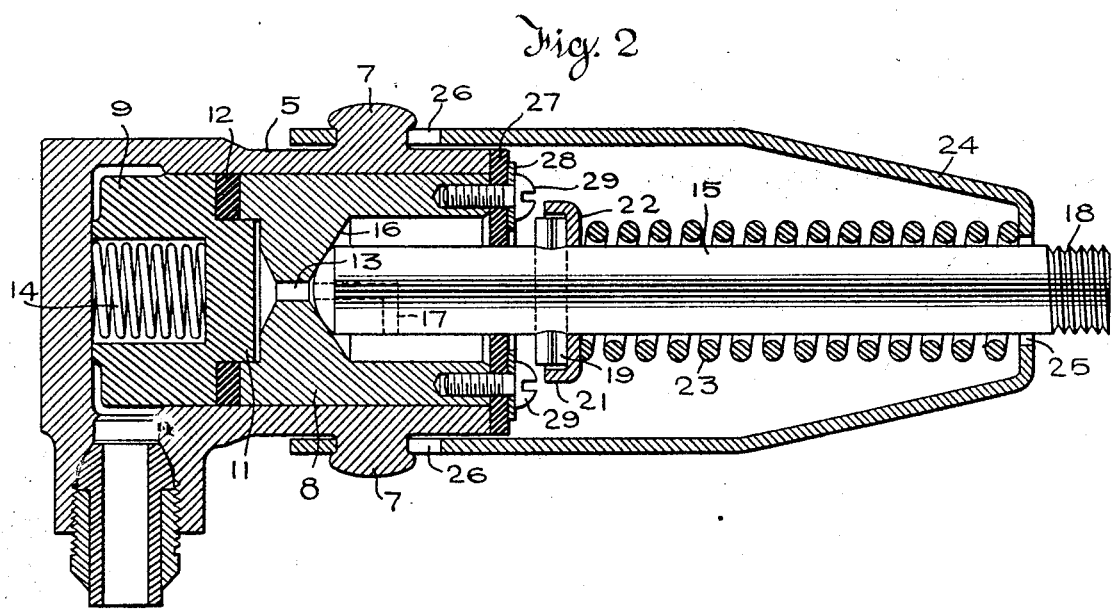
Inventor
Matthew W. Huber
By
Dodge and Sons
Attorneys Patented Mar. 2, 1943

2,312,412

UNITED STATES PATENT OFFICE 2,312,412

WORK CYLINDER

Matthew W. Huber, Chicago, Ill., assignor to Hydraulic Controls, Inc., a corporation of Illinois Application September 17, 1941, Serial No. 411,236

4 Claims. (Cl. 121—38)

This invention relates to expansible chamber motors, and particularly to so-called "work cylinders" used in hydraulic systems to develop large unidirectional forces through short motion ranges. The invention is, however, adaptable to other uses.

Motors of this type are operated at pressures over 1000 pounds and sometimes at high as 2500 pounds per square inch. They are used to actuate clutches, machine brakes and like devices, and to operate various mechanisms on air craft. In the latter field, small size and light weight and the ability to use small liquid conducting tubes for the motive fluid are important considerations. In these fields, simplicity, compactness and ease of disassembly are of more than ordinary importance.

The invention affords a simple compact arrangement of the return spring applicable to existing types of work cylinder using a self-aligning thrust rod.

Such an embodiment of the invention will now be described by reference to the accompanying drawing.

In the drawing:

Fig. 1 is a side elevation.

Fig. 2 is an axial section on the line 2—2 of Fig. 1.

The cylinder 5 is cast in one piece with a base plate having attaching lugs 6 provided with bolt holes as indicated. Formed on the cylinder 5 are diametrically opposed lugs or trunnions 7 which have enlarged heads as shown.

The piston comprises a cup-shaped skirt portion 8 and a head 9. The head 9 has a pilot 11 which is telescopically received in a guide recess formed in the skirt portion 8. Sufficient clearance is afforded at the end of pilot 11 to permit proper compressive action on a gasket 12 which surrounds pilot 11.

The gasket 12 is composed of rubber-like material, preferably one of the tough synthetic plastics having good resistance to the destructive effects of oils. A vent 13 is provided from the space to the right of pilot 11. A coil compression follow-up spring 14, mounted in a cavity in head 9 develops the initial sealing pressure on gasket 12. Hydraulic pressure developed in head 9 increases the sealing pressure in proportion to the load.

The piston and seal construction are the invention of another and are not here claimed.

The push rod 15 has a rounded inner end which engages the conical seat 16 within the cupped portion of the piston skirt 8. It is provided with a vent 17 serving as a continuation of the vent 13. The upper end of the push rod 15 is threaded as indicated at 18 to receive a clevis or other means for connecting the push rod to the work. It will be observed that the rounded thrust end on the push rod permits limited angular displacement of the push rod and this is availed of at times when the upper end of the push rod is connected to a lever or a swinging arm. The push rod is cross-drilled to receive a pin 19 which makes a rather loose fit and which is held against escape by the flange 21 formed on the periphery of the annular spring seat 22. The spring seat 22 sustains the inner end of a coil compression spring 23 which encircles the push rod 15 and bears at its outer end against a U-shaped spring seat member 24 which is provided with an aperture 25 in which the push rod 15 is guided and through which the push rod extends. The spring seat member 24 comprises a strap of wrough metal, preferably steel, which is provided near the end of each of its two arms with a circular aperture 26 each larger than the heads on the trunnions 7. This permits spring seat 24 to be sprung apart to clear the trunnions and then to be pushed inward compressing the spring 23 until the openings 26 pass over the heads of trunnions 7.

The spring seat 24 is thus a substantially U-shaped stirrup which can be readily attached to and disengaged from the trunnions 7.

Attached to the outer end of the skirt portion 8 is an annular gasket 27 which is conveniently of rubberized fabric and which is held in place by a retaining ring 28 attached by screws 29 to the end of the skirt portion 8. This gasket 27 produces a dust excluding seal with the end of the cylinder 5 when the piston is in its inner or inactive position. It also exercises a slight centering action on the push rod 15 and protects the space within the piston skirt 8 against the entrance of dust and water.

It will be observed that even with the clevis or other connecting means mounted on the threads 18, the spring seat 24 may be disengaged from the trunnions 7 after which withdrawal of the pin 19 permits complete dismounting of all the spring and spring seat parts. No tools are required for this dismounting, a fact which is of considerable importance where the motor must be installed in a restricted space.

While the invention has been described in considerable detail, the description is intended to be illustrative rather than limiting, and modifications within the scope of the claims are possible and are contemplated.

I claim:

1. The combination of a cylinder having approximately diametrically opposed lugs, an outwardly acting piston with push rod; a spring reacting inwardly to return the push rod and piston; a spring seat encircling said push rod and there sustaining said spring, said spring seat having laterally displaceable approximately parallel arms capable of engaging said lugs when the spring seat is positioned so as partially to stress said spring; and interengaging means rendered effective by the action of the spring to prevent the escape of the arms from the lugs.

2. The combination of a cylinder having diametrically opposed trunnions; a piston working in said cylinder and having a socket to receive a push rod; a push rod having one end seated in said socket, the rod and socket being formed to permit limited lateral swinging of the push rod; a spring seat on the push rod; a coil spring encircling said rod and at one end engaging said seat; and a generally U-shaped spring seat having an opening through which said push rod passes and around which the other end of said spring seats, said U-shaped spring seat having laterally displaceable arms with openings near the ends thereof, whereby such spring seat may be engaged with said trunnions.

3. The combination of a cylinder having diametrically opposed trunnions; a piston working in said cylinder and having a socket to receive a push rod; a push rod having one end seated on said socket; a spring seat releasably connected with said push rod and when released removable therefrom by withdrawal over said seated end; a spring encircling said rod and at one end engaging said seat; and a generally U-shaped spring seat having an opening through which said push rod passes and around which the other end of said spring seats, said U-shaped spring seat having laterally displaceable arms with openings near the ends thereof whereby such spring seat may be engaged with said trunnions.

4. The combination of a cylinder closed at one end and open at the other, said cylinder having at its sides diametrically opposed trunnions; a piston working in said cylinder and insertable through the open end of the cylinder, said piston having on its side toward the open end of the cylinder a socket to receive a push rod; a push rod seated in said socket and capable of limited angular motion therein relatively to the piston; a spring seat releasably mounted on the push rod and removable over the seated end thereof; a coil spring encircling said push rod and at one end engaging said spring seat; and a second spring seat of generally U-shaped form having an opening through which said push rod passes and around which the other end of said spring seats, said U-shaped spring seat being formed of flexible metal with trunnion receiving apertures whereby the spring seat may be flexed to permit engagement of the trunnions in said openings, the engagement with the trunnions and the flexibility of the spring seat being such as to accommodate limited angular motion of the push rod relatively to the cylinder and piston.

MATTHEW W. HUBER.